United States Patent [19]
Bowman

[11] 3,920,556
[45] Nov. 18, 1975

[54] HEMODIALYSIS SYSTEM

[76] Inventor: Donald B. Bowman, 561 N.W. Van Buren Ave., Corvallis, Oreg. 97330

[22] Filed: June 17, 1974

[21] Appl. No.: 479,998

[52] U.S. Cl. ................................ 210/321; 210/416
[51] Int. Cl.$^2$ ......................................... B01D 31/00
[58] Field of Search .............. 55/16, 155; 23/258.5; 210/96, 321, 436, 472, 416

[56] References Cited
UNITED STATES PATENTS

| | | |
|---|---|---|
| 3,406,826 | 10/1968 | Willock ........................... 210/321 X |
| 3,528,550 | 9/1970 | Cappelen, Jr. ................... 210/321 X |
| 3,651,616 | 3/1972 | Blanchard et al. .................... 55/16 |
| 3,768,653 | 10/1973 | Brumfield ....................... 210/321 X |
| 3,827,561 | 8/1974 | Serfass et al. ................... 210/321 X |

*Primary Examiner*—Frank A. Spear, Jr.
*Attorney, Agent, or Firm*—Graybeal, Barnard, Uhlir & Hughes

[57] ABSTRACT

A motor directly drives a first rotating and reciprocating piston type positive displacement pump which pumps water into a conduit. The input shaft of the pump includes a worm gear which meshes with a circular gear connected to the input shaft of an identical second pump which pumps a dialysate concentrate into the conduit, into admixture with the water. Small bubbles in the resulting hemodialysis solution are formed into large bubbles in a coalescing filter. The large gas bubbles are removed by means of an extracter which includes a wall of hydrophobic material. The gas bubbles containing solution is directed through the extracter on one side of the wall. The opposite side of the wall is subjected to a subatmospheric pressure, so that the gas bubbles will migrate to the wall and the gas will pass through the wall.

2 Claims, 9 Drawing Figures

HEMODIALYSIS SYSTEM

BACKGROUND OF THE INVENTION

1. Field of the Invention

This invention relates to apparatus for preparing a hemodialysis solution, and in particular to the provision of a simplified apparatus for preparing the hemodialysis solution by mixing together heated water and a dialysate concentrate while flowing them together through a conduit leading to the hemodialyzer.

2. Description of the Prior Art

My prior U.S. Pat. No. 3,515,275, granted Jan. 2, 1970, the several patents mentioned therein, and the prior art that was cited and considered by the Patent Office and listed at the end of the patent should be consulted for the purpose of properly evaluating the subject invention and putting it into proper perspective.

U.S. Pat. No. 3,168,872, granted Feb. 9, 1965, to Harry E. Pinkerton and U.S. Pat. No. 3,257,953 granted June 28, 1966 to Harry E. Pinkerton disclose the type of positive displacement piston pump which is being utilized in the system of the present invention.

Additional patents which should be considered for the purpose of putting the present invention in proper perspective are U.S. Pat. Nos. 2,864,506; 3,463,614; 3,492,793; 3,523,408; 3,614,856 and 3,665,680.

SUMMARY OF THE INVENTION

According to the invention, two pumps of the type disclosed by the aforementioned U.S. Pat. No. 3,168,874 are used for proportionally mixing heated water and a dialysate concentrate for the purpose of forming the hemodialysis solution. A motor is used to directly drive the water pump. The input shaft for the water pump is provided with a worm gear which meshes with a circular gear connected to the drive shaft of the dialysate concentrate pump. The worm gear and circular gear provide a speed reduction between the two pumps. This type of speed reduction, and certain characteristics of the pumps themselves result in an apparatus which is reliable and accurate, including when variations occur in the input drive speed.

These and other objects, features, advantages and characteristics of my invention will be apparent from the following detailed description of a typical embodiment of the invention in which reference is made to the accompanying drawing.

BRIEF DESCRIPTION OF THE DRAWING

In the drawing, like reference characters refer to like parts, and.

DESCRIPTION OF THE PREFERRED EMBODIMENT

Figure 1:
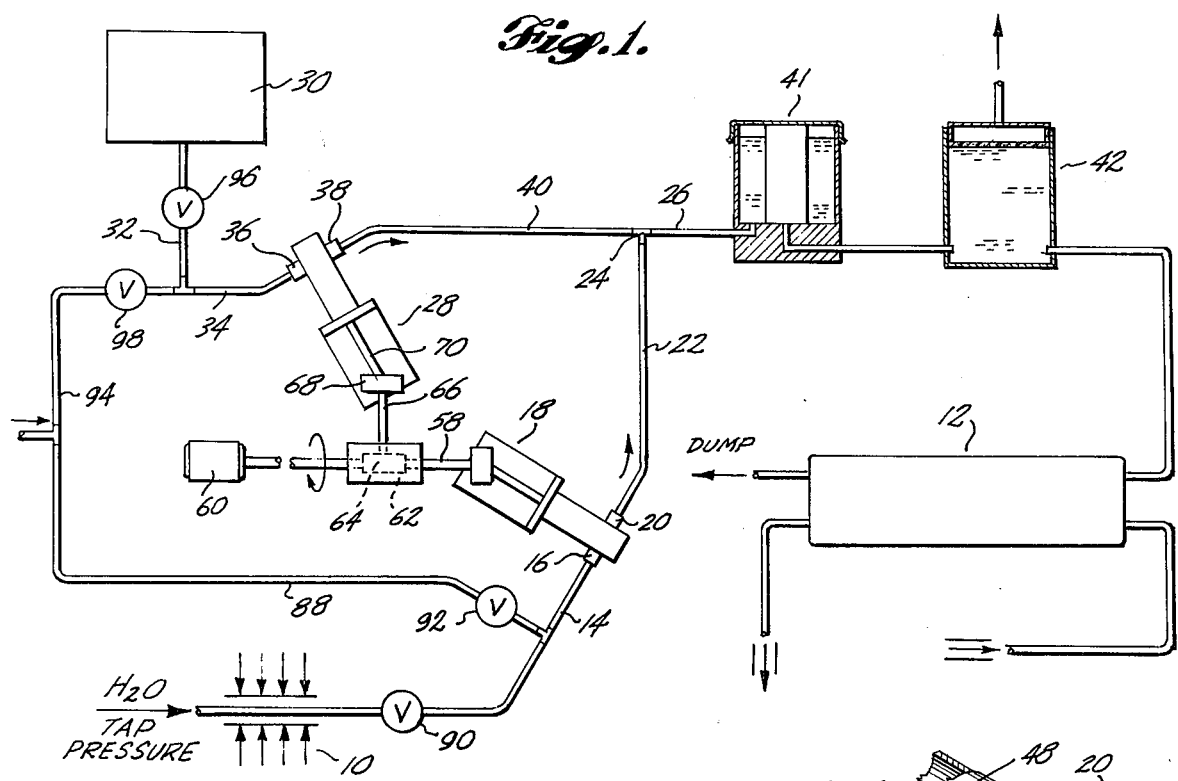
FIG. 1 is a flow diagram of a system of this invention.

Referring first to FIG. 1, in the system of this invention a stream of cold water (e.g. cold tap water) is directed through a flow-through heater 10 and is heated therein to a proper temperature for its use in the dialyzer 12. The heated water flows from the heater 10 through a conduit 14 leading to the inlet 16 of a first positive displacement pump 18. The outlet 20 of pump 18 is connected to a conduit 22 which carries the water to a mixing tee 24 which leads into a hemodialysis solution conduit 26.

A second pump 28 is used to pump the dialysate concentrate from a reservoir 30 through conduits 32, 34 to the pump inlet 36, and out through the pump outlet 38 into a conduit 40 which is connected to one leg of the mixing tee 24.

The water and concentrate become mixed together both in and downstream of the mixing tee 24 (or some other suitable mixing device). The suction action of the pumps 18, 28 the heating of the water, and the mechanical action in the mixing tee 24 help form entrapped gases in the solution into bubbles. According to aspects of this invention, a coalescing filter 41 is located in the hemodialysis solution conduit 26 downstream of the mixing tee 24 and a gas bubble extracter is located in such conduit 26 downstream of the coalescing filter 41. As will hereinafter be described in greater detail in connection with FIG. 9, the filter 41 combines the small bubbles into large bubbles and in the extracter 42 such bubbles are removed from the liquid solution. This liquid solution flows from the extracter 42 through the hemodialyzer 12. In the hemodialyzer 12 the solution passes along one side of semi-permeable membranes in counter flow to the patient's blood which is flowing on the opposite side of the membranes. The cleaned blood is returned to the patient and the spent hemodialysis solution is dumped.

Of course, various types of safety devices and monitors may be added to the system. Since these devices form no part of the present invention they have been omitted from the system diagram.

According to the present invention the water and dialysate concentrate are proportioned by a pair of identical valveless positive displacement piston pumps which are driven by a single drive motor. The pumps are manufactured by Fluid Metering, Inc. of Oyster Bay, New York.

Pump 18 will now be described in reference to FIGS. 2–7.

Pump 18 comprises a cylinder or pump housing having a cylindrical side wall 44 and a closed end wall 46. A blind cylindrical pumping chamber is formed within the housing adjacent the end wall 46. Inlet 16 enters through the side wall 44 and brings liquid into the pumping chamber. Outlet 20 is angularly spaced therefrom (e.g. diametrically opposed). A piston 48 which both rotates and reciprocates is received within the housing. The inboard end of the piston is cut away on one side to provide a liquid passageway. The outboard end portion of the piston 48 has secured thereto a radially projecting drive arm 50. The ball portion of a ball and socket connection 52 is secured to the outer end of the arm 50. Ball 52 is received within a socket 54 carried by a rotatable member 56 at a location spaced radially outwardly from the axis of rotation. A rotary input shaft 58 is connected to member 56.

Figure 2:
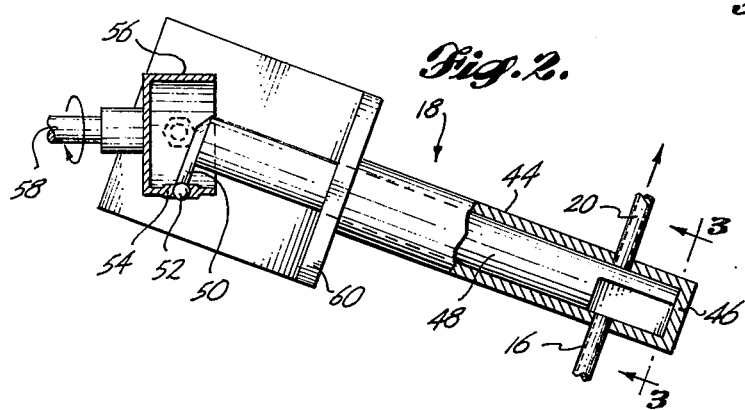
FIG. 2 is an enlarged fragmentary top plan view of one of the pumps in the system, with a part in section and other parts broken away.

The pump sidewall 44 is connected to a bracket 60 which during use of the pump is fixed in position relative to the shaft 58. As shown by FIGS. 1 and 2, the shaft 58 is disposed at an angle with respect to the piston 48. Owing to this arrangement, rotation of shaft 58 causes the piston 48 to both rotate and reciprocate.

Figure 3:
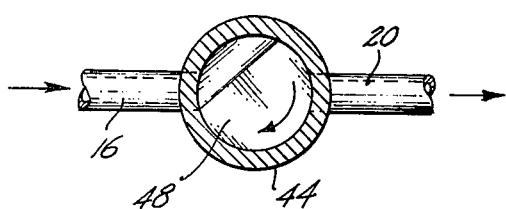
FIG. 3 is an enlarged fragmentary cross-sectional view taken substantially along line 3—3 of FIG. 2.
Figure 4:
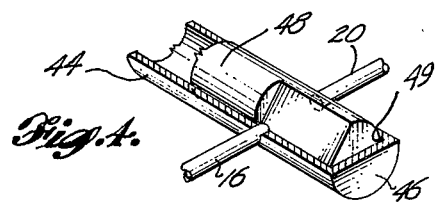
FIGS. 4–7 are fragmentary perspective views, partially sectioned, showing the sequence of operation of the pump, and in particular the transgression of the piston during the pumping cycle.
Figure 5:
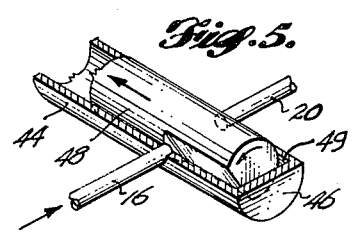
Figure 6:
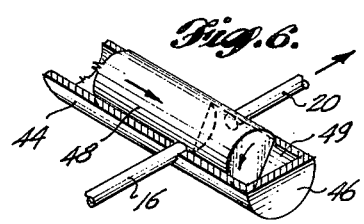
Figure 7:
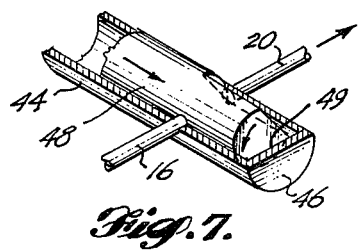

The rotation and reciprocation of piston 48 is in a timed relationship with respect to the inlet and outlet ports 16, 20. FIGS. 2 and 3 show the piston 48 fully extended and about to start its retraction stroke. The cut away portion of the piston 48 is aligned with the inlet port. As the piston 48 retracts a sidewall portion of the piston 48 blocks the outlet port 20. Water is drawn through the inlet 16 and the passageway in the piston 48 into the pumping chamber 49. About the same time that the piston 48 reaches the end of its retraction stroke the cut away of the piston is rotated out of communication with the inlet 16 and into communication with the outlet 20. Then, as the piston 48 is extended it forces the water out from chamber 49 through the passageway in piston 48 and then out through outlet 20.

Figure 8:
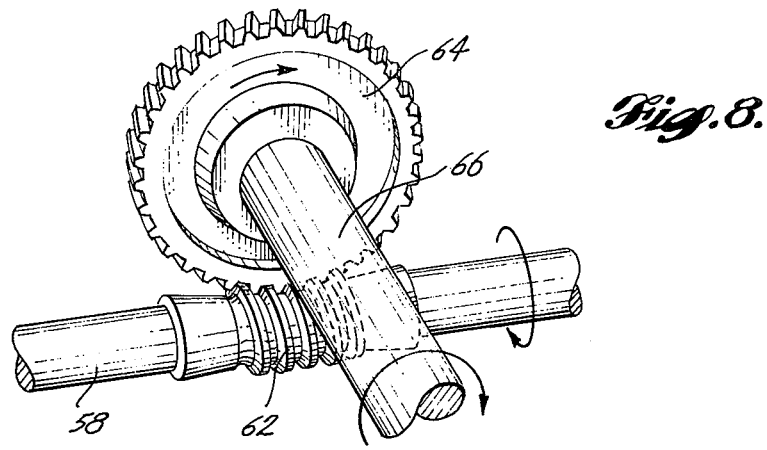
FIG. 8 is an enlarged fragmentary pictorial view of the worm gear speed reduction gearing for driving the dialysate concentrate pump from the water pump.

According to the invention, the drive means which simultaneously rotates and reciprocates the piston includes the rotary input shaft 58. A motor 60 drives shaft 58. Shaft 58 includes a worm gear section 62 (FIG. 8) which is in mesh with a circular gear 64. Gear 64 is connected to the input shaft 66 of pump 28. Worm gear 62 and circular gears 64 together constitute a quite simple speed reduction assembly. In preferred form, the pumps 18, 28 are arranged to have substantially identical stroke lengths. A typical ratio of water to concentrate is 35:1. Thus, the speed reduction gear 62, 64 is designed so that the two pumps 18, 28 will be operated at the speeds necessary to result in the desired proportioning of the two liquids.

In a hemodialysis system it is necessary that the hemodialysis solution be properly constituted at all times. In a continuous flow system it is essential that a correct proportional feeding of the water and the concentrate occurs at all times. It is important that when two proportioning pumps are used that the drive means for the pumps be adapted to take in consideration possible variations in the drive speed of whatever drive motor is used. In some installations at least it is desirable to use a water turbine for driving both pumps. The water turbine is driven by tap water. Thus, the drive speed varies as the pressure of the tap water varies. It is necessary to select pumps which are designed to have a flow rate which changes in direct proportion to changes in the drive speed. I have found that these criteria are met by the pump selection and the worm and ring gear reduction gearing which characterize my invention.

It is essential that the hemodialysis solution that is delivered to the dialyzer 12 be substantially gas free. The water that enters into the system through the heater 10 contains a substantial amount of trapped gas. The addition of heat and the suction which occurs in the pump 18, and the mechanical agitation which occurs in the mixing tee 24 help form the trapped gas into bubbles. According to an aspect of this invention, the hemodialysis solution is directed from the mixing tee 24 into a coalescing filter which is provided for the purpose of combining small gas bubbles to make large gas bubbles.

Figure 9:
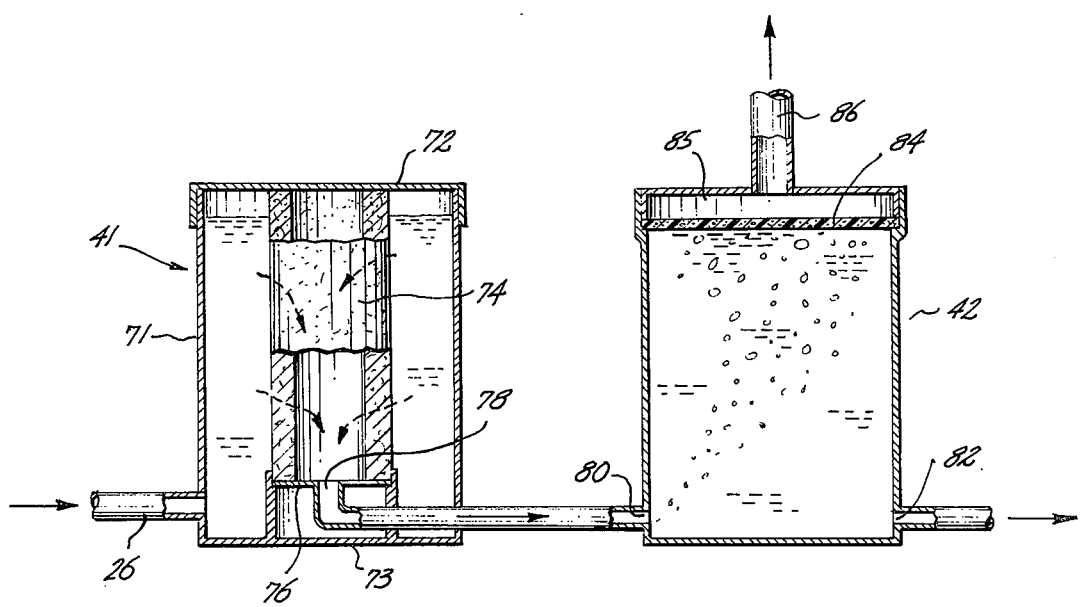
FIG. 9 is an enlarged scale sectional view of a coalescing filter and a gas bubble extracter.

Referring to FIG. 9, the filter 41 is shown to comprise a cylindrical side wall 71 closed at one end by a fixed wall 73 and at the other end by a removable wall or cap 72. A porous tube 74 is mounted inside of the filter housing on a plate 76 in which an outlet orifice 78 is formed. The hemodialysis solution is delivered through conduit 26 into the annular space surrounding the tubular porous member 74. As the solution flows through the pore of member 74 the small gas bubbles are combined and large ones are formed. The solution is then directed through inlet 80 into the interior of extracter 42. While in extracter 42 the solution is located on one side of wall 84 formed from a hydrophobic material. The opposite side 85 of this wall 84 is connected via a conduit 86 to a source of subatmospheric pressure. A subatmospheric pressure causes the gas bubbles to flow from the liquid and through the hydrophobic material and into the conduit 86, to be exhausted from the system. The degassed hemodialysis solution flows out from the extracter 42 via an outlet port 82.

It is believed that the particular type of pump and the worm gear — circular gear reduction gearing which together constitute the proportioning equipment of this invention result in a proportioning system which is extremely accurate throughout the full range of drive speeds which may be encountered. Such equipment is quite simple in its makeup and is capable of being used for a long period of time without a decrease in performance or efficiency. The degassing is accomplished quite simply and in a manner which takes advantage of the bubble formation which naturally occurs when the water is heated and subjected to suction in the pump and in the mixing valve.

In FIG. 1 the system is shown to include a flushing system for the two pumps 18, 28. A flushing fluid conduit 88 joins the water conduit 14 between the heater 10 and the pump 18. Line 14 is provided with an off-on valve 90 upstream of the junction. A similar off-on valve 92 is provided in conduit 88. Another flushing fluid conduit 94 is connected to dialysate concentrate line 34. An off-on valve 96 is located in dialysate concentrate line 32 and another off-on valve 98 is provided in flushing fluid line 94.

The flushing fluid may be water or a solution of water and a suitable cleansing agent.

When it is desired to cleanse the pumps 18, 28 the valves 90, 96 are closed, valves 92, 98 are open, and a suitable flushing fluid is delivered into the conduits 88, 94. From conduits 88, 94 the flushing fluid flows through conduits 14, 34, the pumps 18, 28, conduits 22, 40 and conduit 26 leading to and through the dialyzer 12.

Reference is made to my aforementioned U.S. Pat. No. 3,515,275 for a description of safety devices and monitors which may be used with a system of this invention. Also, U.S. Pat. No. 3,515,275 discloses a jet pump arrangement which may be used for drawing a vacuum on hydrophobic wall 84 and/or influencing flow of the hemodialysis fluid through the dialyzer 12.

It is to be understood that the invention is to be limited only by the appended claims.

What is claimed is:

1. In an apparatus for preparing a hemodialysis solution by admixing a proportional amount of a dialysate concentrate into a metered stream of flowing water, the improvement comprising:

a hemodialysis fluid conduit which leads to a hemodialyzer;

a first positive displacement pump for pumping water into said conduit;

a second substantially identical positive displacement pump for pumping a proportionate amount of dialysate concentrate into the conduit, into admixture with said water;

each said positive displacement pump comprising side and end wall means together defining a blind cylindrical pumping chamber which includes angularly spaced apart inlet and outlet ports in the side wall means, a piston extending into said pumping chamber and including a fluid passageway, and drive means for simultaneously rotating and reciprocating said piston, so that the fluid passageway is in communication with the inlet port and the outlet port is blocked by the piston when the piston is being retracted and the fluid passageway is in communication with the outlet port and the inlet port is blocked by the piston when the piston is being advanced, said drive means including a rotary input shaft;

a two gear reduction means comprising a worm gear on the rotary input shaft of the first pump and a circular gear on the rotary input shaft of the second pump in mesh with siad worm gear, said worm and circular gears having a gear ratio providing a speed reduction between the first pump and the second pump resulting in the desired proportioning of the dialysate concentrate and the water; and motor means connected to the rotary input shaft of said first pump for rotating said shaft, whereby said motor means directly drives said first pump and through said gear reduction means proportionally drives the second pump.

2. The improvement of claim 1, wherein said motor means is a water turbine driven by tap water.

* * * * *